United States Patent [19]

Watase et al.

[11] 3,879,382

[45] Apr. 22, 1975

[54] PROCESS FOR THE RECOVERY OF D- OR L-α-AMINO-ε-CAPROLACTAM HYDROCHLORIDE OF ENHANCED OPTICAL PURITY FROM MIXTURES OF D- AND L-α-AMINO-ε-CAPROLACTAM HYDROCHLORIDE

[75] Inventors: Hideo Watase, Hino; Yasuhisa Ohno, Hachioji; Tadayoshi Nakamura; Tadashi Okada; Toru Takeshita, Hino, all of Japan

[73] Assignee: Teijin Limited, Osaka, Japan

[22] Filed: Aug. 22, 1972

[21] Appl. No.: 282,667

[30] Foreign Application Priority Data

Aug. 27, 1971 Japan............................... 46-65726
Jan. 19, 1972 Japan................................. 47-7525
Jan. 22, 1972 Japan................................. 47-8537
Feb. 14, 1972 Japan............................... 47-15474

[52] U.S. Cl.......................................... 260/239.3 R
[51] Int. Cl............................................. C07d 41/06
[58] Field of Search............................. 260/239.3 R

[56] References Cited
UNITED STATES PATENTS

| | | | |
|---|---|---|---|
| 3,105,067 | 9/1963 | Nelemans et al. | 260/239.3 R |
| 3,275,619 | 9/1966 | Brenner et al. | 260/239.3 R |
| 3,542,766 | 11/1970 | Ohnogi et al. | 260/239.3 R |
| 3,591,579 | 7/1971 | Shibahara et al. | 260/239.3 R |
| 3,658,811 | 4/1972 | Tanaka et al. | 260/239.3 R |

*Primary Examiner*—Henry R. Jiles
*Assistant Examiner*—Robert T. Bond
*Attorney, Agent, or Firm*—Sherman & Shalloway

[57] ABSTRACT

A process for the recovery of D- or L-α-amino-ε-caprolactam hydrochloride of enhanced optical purity from a mixture of D- and L-α-amino-ε-caprolactam hydrochloride, which comprises crystallizing out D-or L-α-amono-ε-caprolactam hydrochloride from a solution of D-α-amino-ε-caprolactam hydrochloride and L-α-amino-ε-caprolactam hydrochloride dissolved in a polar solvent, (1) the said solution containing, dissolved therein, at least one of the said D-α-amino-ε-caprolactam hydrochloride and L-α-amino-ε-caprolactam hydrochloride in the super saturated state and (2) the said solution comprising, in addition to the said D- and L-α-amino-ε-caprolactam hydrochloride, A. a basic substance having pKb value of not greater than 5 as measured at 29°C. in water or substance having a basicity equivalent thereto, and/or B. a salt of mixture of D- and L-α-amino-ε-caprolactam having a solubility in the said polar solvent which is greater than the solubility of D- and L-α-amino-ε-caprolactam hydrochloride in the said polar solvent and recovering the crystallized product.

9 Claims, No Drawings

PROCESS FOR THE RECOVERY OF D- OR L-α-AMINO-ε-CAPROLACTAM HYDROCHLORIDE OF ENHANCED OPTICAL PURITY FROM MIXTURES OF D- AND L-α-AMINO-ε-CAPROLACTAM HYDROCHLORIDE

This invention relates to a process for the recovery of D-α-amino-ε-caprolactam hydrochloride (D-$NH_2CL.HCl$) or L-α-amino-ε-caprolactam hydrochloride (D-$NH_2CL.HCl$) of enhanced optical purity from a mixture of D-$NH_2CL.HCl$ and L-$NH_2CL.HCl$.

In the present specification, by the term "a mixture of D- and L-α-amino-ε-caprolactam hydrochloride" is meant not only a racemic compound of D-$NH_2CL.HCl$ and L-$NH_2CL.HCl$ and a racemic mixture of D-$NH_2CL.HCl$ and L-$NH_2CL.HCl$, but also a molecular or crystalline mixture of D-$NH_2CL.HCl$ and L-$NH_2CL.HCl$ at any mixing ratio. The same definition applies to the term "D- and L-α-amino-ε-caprolactam."

α-Amino-ε-caprolactam ($NH_2CL$) can be synthesized starting from ε-caprolactam or intermediates for its production, which are available in large quantities and at low costs as materials for the production of nylon-6 and the like. α-Amino-ε-caprolactam is a key compound for the production of lysine, and it can be easily hydrolyzed to form lysine.

However, because the compound is normally obtained as a racemic compound or a racemic mixture of L-α-amino-ε-caprolactam and D-α-amino-ε-caprolactam (both the racemic compound and the racemic mixture are inclusively called "racemic α-amino-ε-caprolactam" or "α-amino-ε-caprolactam of the racemic form."), this racemic α-amino-ε-caprolactam needs to be optically resolved and the resulting optically active L-α-amino-ε-caprolactam nees to be hydrolyzed, in order to obtain optically active L-lysine monohydrochloride which is valuable for medicinal uses and as a fortifying agent for human or animal diets.

As the method for the optical resolution of racemic α-amino-ε-caprolactam, (racemic $NH_2CL$), there have been known a seeding method comprising converting racemic $NH_2CL$ to its hydrobromide or its β-naphthalene-sulfonate and adding to a solution of the salt a seed of such salt of optical active $NH_2CL$, and a method called "diastreomer method" (U.S. Pat. No. 3,275,619 and Belgian Pat. No. 696,183). In the former seeding method, expensive hydrobromic acid or β-naphthalenesulfonic acid had to be used, and in order to obtain valuable optically active lysine hydrochloride from the hydrobromice or the β-naphthalenesulfonate of optically active $NH_2CL$ obtained by the optical resolution, it is necessary to convert the hydrobromide or the β-naphthalenesulfonate to optically active $NH_2CL$ and separate it after the optical resolution, and to convert it to optically active lysine by the hydrolysis. Accordingly, either from the economical or operational viewpoint, this method cannot be said to be practical.

In the latter diastereomer method, an expensive optical resolving agent needs to be used and the step of separating the resulting diastereomeric salt into each constituent is indispensable. If sufficient separation is not accomplished in the separating step, such diaadvantages as loss of the expensive resolving agent and reduction of purity of lysine owing to incorporation of the resolving agent in the product result.

Further, a method of recovering $NH_2CL.HCl$ of enhanced optical purity by fractional crystallization or extraction of $NH_2CL.HCl$ of low optical purity with the use of water, aqueous ethanol or aqueous methanol has been known (for instance, British Pat. No. 1,256,416). In this method, from a mixture of D- and L-$NH_2CL.HCl$ containing one optical isomer (L-$NH_2CL.HCl$) in a much greater amount than the other optical isomer (D-$NH_2CL.HCl$), $NH_2CL.HCl$ of enhanced optical purity containing only the optical isomer in the excess amount is recovered. Accordingly, in this method it is impossible to obtain optically active $NH_2CL.HCl$ from racemic $NH_2CL.HCl$, and use of a mixture containing one optical isomer in a much greater amount than the other optical isomer is indispensable. Further, the amount of the optical isomer contained in the greater amount and recovered in the state having enhanced optical purity from such mixture is at most an amount corresponding to the difference between the total amount of said optical isomer contained in the greater amount in the starting mixture and the amount necessary for forming a mixture of equal parts of both the optical isomers. Still further, if the recovery ratio is heightened to a level approximating such maximum amount, the optical purity of the product is much reduced. These are defects and disadvantages of the above known method. Hence, this method cannot constitute an optical resolution.

It is therefore a primary object of this invention to provide a process for separating and recovering easily and economically D-$NH_2CL.HCl$ and/or L-$NH_2CL.HCl$ of enhanced optical purity from a mixture containing D-$NH_2CL.HCl$ and L-$NH_2CL.HCl$ at any mixing ratio without employing any particular optical resolving agent.

Another object of this invention is to provide a process for separating and recovering L-$NH_2CL.HCl$ and/or D-$NH_2CL.HCl$ from racemic $NH_2CL.HCl$.

Still another object of this invention is to provide a process for separating and recovering from a mixture containing D-$NH_2CL.HCl$ and L-$NH_2CL.HCl$ at an optional ratio, the optical isomer contained in a greater amount in the state having enhanced optical purity, in an amount exceeding the amount corresponding to the difference between the total amount of said optical isomer contained in the greater amount in the starting mixture and the amount necessary for formation of a mixture of equal parts of both the optical isomers, namely in such a great amount that in the mother liquor left after the recovery of the optical active $NH_2CL.HCl$, the other optical isomer contained in a smaller amount in the starting mixture is present in turn in an excessive amount.

A further object of this invention is to provide a process in which D-$NH_2CL.HCl$ and L-$NH_2CL.HCl$ of enhanced optical purity are separated and recovered successively from a mixture containing these optical isomers at any mixing ratio, thereby to obtain both D-$NH_2CL.HCl$ and L-$NH_2CL.HCl$ of enhanced optical purity in the form separated from each other.

Other objects and advantages of this invention will be apparent from the description given hereinbelow.

The above objects and advantages of this invention can be attained by a process for the recovery of D- or L-α-amino-ε-caprolactam hydrochloride of enhanced optical purity from a mixture of D- and L-α-amino-ε-caprolactam hydrochloride, which comprises crystallizing out D- or L-α-amino-ε-caprolactam hydrochloride from a solution of D-α-amino-ε-caprolactam hydrochloride and L-α-amino-ε-caprolactam hydrochloride dissolved in a polar solvent, (1) the said solution containing dissolved therein, at least one of the said D-α-amino-ε-caprolactam hydrochloride and L-α-amino-ε-caprolactam hydrochloride in the supersaturated state and (2) the said solution comprising, in addition to the said D- and L-α-amino-ε-caprolactam hydrochloride, A. a basic substance having a $_pK_b$ value of not greater than 5 as measured at 25°C. in water or a substance having a basicity equivalent thereto, and/or B. a salt of a mixture of D- and L-α-amino-ε-caprolactam having a greater solubility in the said polar solvent than D- and L-α-amino-ε-caprolactam hydrochloride;

and recovering the crystallized product.

This invention will now be illustrated in more detail.

STARTING MATERIAL

Mixtures containing D-α-amino-ε-caprolactam hydrochloride (D-NH$_2$CL.HCl) and L-α-amino-ε-caprolactam hydrochloride (L-NH$_2$CL.HCl) at any mixing ratio may be used in this invention.

As the method for synthesis of NH$_2$CL, there are known many methods including those in which ε-caprolactam or intermediates for its production such as cyclohexanol, chlorocyclohexane, etc., are used as starting materials (see, for example, U.S. Pat. No. 3,052,670 and German Pat. No. 1,955,038). NH$_2$CL synthesized by such a method takes always a racemic form (D,L-NH$_2$CL) containing equal parts of D-NH$_2$CL and L-NH$_2$CL.

A mixture containing either of D-NH$_2$CL and L-NH$_2$CL in excess may be obtained by incorporating D-NH$_2$CL or L-NH$_2$CL into racemic D,L-NH$_2$CL synthesized by such a method, or is obtained in the form of the residue left after a part of D-NH$_2$CL or L-NH$_2$CL is separated from racemic D,L-NH$_2$CL by the optical resolution.

Such mixture of D-NH$_2$CL and L-NH$_2$CL may be converted to a mixture of D- and L-α-amino-ε-caprolactam hydrochloride, to which the definition has been given hereinabove, by dissolving the mixture of D-NH$_2$CL and L-NH$_2$CL in a suitable solvent such as water, a lower alcohol, e.g., methanol, and an aqueous solution thereof, and blowing into the solution an equimolar amount or slightly excessive amount of hydrogen chloride.

SOLVENT

In this invention, this mixture containing D-NH$_2$CL.HCl and L-NH$_2$CL.HCl at any mixing ratio is dissolved in a polar solvent to form a solution in which at least one of D-NH$_2$CL.HCl and L-NH$_2$CL.HCl is dissolved in the supersaturated state.

Any polar solvent being unreactive with D-NH$_2$CL.HCl and L-NH$_2$CL.HCl and capable of dissolving them therein may be used in this invention. The reason for the use of a polar solvent in this invention is that D-NH$_2$CL.HCl and L-NH$_2$CL.HCl are, in general, insoluble or hardly soluble in non-polar solvents. Even if D- and L-NH$_2$CL.HCl is dissolved in a non-polar solvent, its solubility is very low.

Of the polar solvents, one exhibiting a high dissolving power for D- and L-NH$_2$CL.HCl and being economical is preferred.

As such preferred polar solvents there may be mentioned, for instance, (i) water, (ii) mono- to tri-hydric aliphatic alcohols, (iii) ketones, (iv) aliphatic carboxylic acids and lower alkyl esters thereof, (v) N-unsubstituted amides and N-alkyl-substituted amides, (vi) sulfoxides, (vii) cyclic ethers, (viii) aliphatic nitriles, and (ix) mixtures of at least two selected from (i) to (viii) above.

More preferred examples of such polar solvents are as follows:

(i) Water:

Ordinary water for industrial use may be employed advantageously.

(ii) Mono- to tri-hydric aliphatic alcohols:

In general, mono-, di- and tri-hydric alcohols having 1 to 6 carbon atoms are preferably used. For instance, monohydric alcohols such as methanol, ethanol, n-propanol, isopropanol n-butanol, sec-butanol, isobutanol, tert-butanol, n-pentanol, methyl cellosolve and ethyl cellosolve, dihydric alcohols such as ethyleneglycol, trimethyleneglycol, tetramethyleneglycol, diethyleneglycol and glycerine monomethyl ether, and trihydric alcohol such as glycerine and trimethylolpropane are preferably employed.

(iii) Ketones:

Of ketones, aliphatic ketones having up to 6 carbon atoms are preferred. Specific examples of such preferred ketones are acetone, methylethylketone, methylisopropylketone and methylisobutylketone.

(iv) Aliphatic carboxylic acids and their lower alkyl esters:

Use of aliphatic carboxylic acids having up to 10 carbon atoms such as aliphatic monocarboxylic acids, e.g., formic acid, acetic acid, n-propionic acid, isopropionic acid, n-butyric acid, iso-butyric acid and sec-butyric acid is preferred. Also halogen-substituted carboxylic acids such as monochloroacetic acid, dichloroacetic acid and trichloroacetic acid are preferably used. Still further, lower alkyl esters of carboxylic acids such as mentioned above, for instance, methyl acetate, ethyl acetate and methyl propionate are preferably used.

(v) N-unsubstituted amides and N-alkyl-substituted amides:

Of N-unsubstituted amides, formamide and acetamide are preferred, and as N-alkyl-substituted amides are preferably used, for instance, dimethylformamide, dimethylacetamide, N-methyl-α-pyrrolidone and hexamethylphosphorylamide.

(vi) Sulfoxides:

Dimethylsulfoxide, diethylsulfoxide, methylethylsulfoxide and the like are used preferably as sulfoxides.

(vii) Cyclic ethers:

1,4-Dioxane, 1,3-dioxane, tetrahydrofuran and the like are suitable as cyclic ethers.

(viii) Aliphatic nitriles:

Preferable aliphatic nitriles include acetonitrile, propionitrile, butyronitrile and the like.

(ix) Mixtures of at least two of (i) to (viii) above;

Any combination of at least two of the above polar solvents (i) to (vii) at any mixing ratio may be used in the form of a mixed solvent. Mixed solvents consisting of at least two polar solvents selected from methanol, ethanol, ethyleneglycol, glycerine, acetone, acetic acid, dimethylformamide, dimethylsulfoxide, 1,4-dioxane, acetonitrile and the like, and mixed solvents consisting of water and at least one polar solvent selected from those exemplified above, are preferably used.

In this invention, a solution in which a racemic mixture of α-amino-ε-caprolactam hydrochloride is dissolved in such polar solvent in the supersaturated state, or a solution in which a mixture of α-amino-ε-caprolactam containing either of L-NH$_2$CL.HCl and D-Nh$_2$CL.HCl in a greater amount than the other optical isomer is dissolved in the polar solvent such that at least one of L-NH$_2$CL.HCl and D-NH$_2$CL.HCl is dissolved in the supersaturated state, is used. In short, D-NH$_2$CL.HCl and L-NH$_2$CL.HCl are dissolved in the polar solvent such that at least one of the two optical isomers is dissolved in the supersaturated state.

ADDITIVE

In this invention, at least one compound selected from (A) a substance having a $_pK_b$ value of not greater than 5 as measured at 25°C. in water or a substance having a basicity equivalent theeto and (B) and a salt of a mixture of D- and L-α-amino-ε-caprolactam having a solubility in the polar solvent which is greater than the solubility in the polar solvent of D- and L-α-amino-ε-caprolactam hydrochloride, is also dissolved as an additive in the polar solvent, while D-NH$_2$CL.HCl and L-NH$_2$CL.HCl are dissolved in the polar solvent such that at least one of them is dissolved in the supersaturated state.

As additive (A), there may be preferably used, for example, (i) aliphatic amines, (ii) alicyclic amines, (iii) heterocyclic amines, (iv) alkali metal hydroxides and (v) alkaline earth metal hydroxides. Specific examples of such basic substances are as follows.

(i) Aliphatic amines:

There may be exemplified methylamine, ethylamine, n-propylamine, isopropylamine, n-butylamine, tert-butylamine, sec-butylamine, n-amylamine, iso-amylamine, n-hexylamine, n-pentylamine, n-octylamine, dimethylamine, diethylamine, di-n-propylamine, di-isopropylamine. di-n-butylamine, di-tert-butylamine, di-sec-butylamine, di-n-amylamine, trimethylamine, triethylamine, tri-n-propylamine, tri-n-butylamine, ethylenediamine, propylenediamine, trimethyenediamine, tetramethylenediamine, pentamethylenediamine, hexamethylenediamine, diethylenetriamine, triethylenetetramine, allylamine, monoethanolamine, diethanolamine, triethanolamine, benzylamine, dibenzylamine, β-phenylethylamine, o-methylbenzylamine, tetramethyl ammonium hydroxide, tetra-n-butyl ammonium hydroxide and tetraethyl ammonium hydroxide.

(ii) Alicyclic amines:

As alicyclic amines, there may be mentioned, for example, cyclopentylamine, cyclohexylamine, dicyclopentylamine, dicyclohexylamine and tricyclohexylamine.

(iii) Heterocyclic amines:

As heterocyclic amines, there may be mentioned, for instance, pyrrolidine, piperidine, 2-methylpiperidine, piperazine, α-amino-ε-caprolactam, α-aminolaurylolactam, melam and melem.

(iv) Alkali metal hydroxides:

There may be exemplified lithium hydroxide, sodium hydroxide, potassium hydroxide, rubidium hydroxide and cesium hydroxide. Of these, lithium hydroxide, sodium hydroxide and potassium hydroxide are especially preferably used.

(v) Alkaline earth metal hydroxides:

As alkaline earth metal hydroxides, there may be mentioned, for example, magnesium hydroxide, calcium hydroxide and barium hydroxide.

In addition to the above basic substances (i) to (v), there may be employed such compounds as sodium methoxide, potassium methoxide, sodium ethoxide, potassium ethoxide, sodium propoxide, potassium propoxide, sodium butoxide, potassium butoxide, sodium formate, potassium formate, sodium acetate, potassium acetate, sodium propionate, potassium propionate, sodium benzoate, potassium benzoate, sodium salicylate, potassium salicylate, sodium succinate, potassium succinate, sodium adipate, potassium adipate, ammonia and guanidine.

Not only salts of a racemic mixture of α-amino-ε-caprolactam, but also salts of any mixture of L-NH$_2$CL and D-NH$_2$CL may be used as additive (B), as long as they have a greater solubility in the polar solvent to be used than D- and L-NH$_2$CL.HCl.

As such salts are used preferably (vi) carboxylic acid salts, (vii) carbonates and (viii) sulfates of mixtures of L-NH$_2$CL and D-NH$_2$CL.

Examples of the carboxylic acid salt (vi) include salts of monobasic aliphatic carboxylic acids having 1 to 4 carbon atoms such as formic acid, acetic acid, propionic acid and butyric acid, salts of monobasic aromatic carboxylic acids such as benzoic acid and salicyclic acid, dibasic acids having 2 to 6 carbon atoms such as oxalic acid, malonic acid, succinic acid, citric acid, glutaric acid and adipic acid, hydroxycarboxylic acids such as glycolic acid, lactic acid and tartaric acid, and amino acids such as glutamic acid and aspartic acid.

Any of salts of the carboxylic acids such as exemplified above may be used as the additive (B), as long as its solubility in the polar solvent to be used is greater than the solubility of D- and L-NH$_2$CL.HCl in the polar solvent.

As the additive to be used according to this invention, a mixture of L-NH$_2$CL and D-NH$_2$CL, especially a racemic mixture of D,L-NH$_2$CL, and its monobasic carboxylate, its carbonate or its sulfate are particularly preferred.

It is preferred that the basic substance (A), expecially the mixture of L-NH$_2$CL and D-NH$_2$CL, or the salt of the D- and L-NH$_2$CL mixture (B) is present in the state dissolved in the polar solvent in an amount of at least 0.2 mole, especially at least 0.5 mole, per mole of the D,L-NH$_2$CL.HCl mixture dissolved in the polar solvent. The amount of the additive to be made present in the state dissolved in the polar solvent may be within such a range that the additive can be dissolved in the polar solvent and that at least one optical isomer of D-NH$_2$CL.HCl and L-NH$_2$CL.HCL is dissolved in the polar solvent and the supersaturated dissolution state of the one optical isomer can be maintained. Accordingly, the upper limit of the amount of the additive added varies depending on the kind of the additive and the kind of the polar solvent. For instance, when the optical resolution of racemic D,L-NH$_2$CL.HCl is effected with the use of racemic D,L-Nh$_2$CL and an aqueous solution of a monohydric alcohol having a water content of less than 50 percent (for example, aqueous methanol), better results are obtained by making the racemic D,L-Nh$_2$CL present in the dissolved state in an amount of, for example, about 10 moles or less, preferably about 8 moles or less, per mole of the racemic D,L-$NH_2CL.HCl$.

When aliphatic, alicyclic and heterocyclic amines other than D,L-$NH_2CL$, or alkali metal and alkaline earth metal hydroxides are added and dissolved as the additive (A), most of these basic substances catch the HCl of D- and/or L-$NH_2CL.HCl$ dissolved in the supersaturated soltuion, thereby to form D- and/or L-$NH_2CL$ in the polar solvent. In such cases, a similar effect to that obtained when a mixture of D- and L-$NH_2CL$ is added and dissolved as the additive is sometimes manifested.

However, when such basic substances are made present in the dissolved state, the amount of D- and L-$NH_2CL.HCl$ is decreased by the formation of D- and L-$NH_2CL$ and hence, in some cases, it becomes impossible to maintain the supersaturated dissolution state of D- and/or L-$NH_2CL.HCl$. In such cases, care must be taken so as to maintain the supersaturated dissolution state of D- and/or L-$NH_2CL.HCl$ in the polar solvent by either further adding D- and L-$NH_2HCl$ mixture, limiting the amount of the additive added, supplying hydrogen chloride into the solution, or adjusting the solution temperature appropriately.

As compared with the cases where the optical resolution is carred out without the additive of this invention, the optical resolution process according to this invention makes it possible to separate and recover L-$NH_2CL.HCl$ or D-$NH_2CL.HCl$ of more enhanced optical purity from a mixture of D- and L-$NH_2CL.HCl$ as illustrated in the Examples given below. Furthermore, when one of the optical isomers of the same optical purity is to be recovered, it is possible according to this invention to obtain a much greater amount of the desired optical isomer than in the case where no additive is used.

As regards the reason why such effects are attained by the additive of this invention, we consider that the presence of the additive in the dissolved state may be effective for maintaining the supersaturated dissolution state of D- and/or L-$NH_2CL.HCl$ more stably, and that in case a mixture of D- and L-$NH_2CL$ as mentioned in (A) above, or a salt thereof as mentioned in (B) above, is used as the additive, as compared with the case where such additive is not used, the additive may exhibit an activity to suppress effectively the crystallization of the hydrochloride of the undesired optical isomer (e.g. D-$NH_2CL.HCl$). This crystallization is likely to be brought about by the increase of the relative concentration of said optical isomer in the solution caused by the progress of the crystallization hydrochloride of the intended optical isomer (e.g. L-$NH_2CL.HCl$).

In order to prepare the above-mentioned solution of polar solvent to be used in this invention, in which (1) a mixture of D- and L-$NH_2CL.HCl$ is dissolved so that at least one of said optical isomers is dissolved in the supersaturated state and (2) at least one additive selected from additives (A) and (B) is made present in the dissolved state, a suitable amount of D- and L-$NH_2CL.HCl$ as mentioned in (1) above is dissolved at first in a suitable polar solvent, if necessary, under heating, and the supersaturated state of D-$NH_2CL.HCl$ and/or L-$NH_2CL.HCl$ is attained by a suitable treatment such as cooling, concentration or variation in the solutioh composition. Then a prescribed amount of the additive is added to the solution while maintaining the supersaturated state. It is also possible to adopt a method comprising dissolving in advance the additive in the polar solvent, adding and dissolving the mixture of D- and L-$NH_2CL.HCl$ as mentioned in (1) above into such solution, and attaining the supersaturated state by a suitable treatment such as mentioned above.

In case it is made difficult to maintain the supersaturated state of D- or L-$NH_2CL.HCl$ by the addition of the additive, as mentioned above, the superstaturated state can be maintained conveniently by adding fresh D- and L-$NH_2CL.HCl$ or HCl, or by conducting a suitable treatment such as cooling or concentration of the solution.

On the preparation of such supersaturated solutions, some additives catch the HCl of the D- and L-$NH_2CL.HCl$ dissolved in the polar solvent and they precipitate in the form of the hydrochloride. In such case, the supersaturated state may be attained by separating such precipitated hydrochloride prior to the preparation of the supersaturated solution and then effecting, for instance, concentration or cooling. In case the precipitated hydrochloride can readily be separated from the resulting L- or D-$NH_2CL.HCl$ of enhanced optical purity, the crystallization of L- or D-$NH_2CL.HCl$ or enhanced optical purity may be carried out without preliminary separation of the precipitated hydrochloride of the additive from the supersaturated solution.

CRYSTALLIZATION OF D- OR L-$NH_2CL.HCl$

Either of the following two methods may be adpoted to crystallize D-$NH_2CL.HCl$ or L-$NH_2CL.HCl$ of enhanced optical purity out of the prepared solution of polar solvent in which at least one of D-$NH_2CL.HCl$ and L-$NH_2CL.HCl$ is dissolved in the supersaturated state and at least one member selected from the additives as mentioned above is made present in the dissolved state (which will be referred to merely as "supersaturated solution" hereinbelow).

Method 1

In the case of fractional crystallization of D- or L-$NH_2CL.HCl$ of enhanced optical purity from the supersaturated solution in which equal parts of D-$NH_2CL.HCl$ and L-$NH_2CL.HCl$ are dissolved, seeding needs to be effected. A small amount of an optical isomer the same as the intended isomer to be recovered is added to the supersaturated solution as a seed. The seed is desireably in the crystal form having an optical purity as high as possible. The amount of the seed is not particularly critical. Satisfactory results can be usually attained by adding the seed in an amount of about 1 to 10 percent by weight based on the amount of D,L-$NH_2CL.HCl$ dissolved in the supersaturated solution.

Method 2

In the case of fractional crystallization of D- or L-$NH_2CL.HCl$ of enhanced optical purity from the supersaturated solution in which one of the optical isomers is dissolved in a greater amount, the said optical isomer contained in a greater amount is naturally crystallized out from the supersaturated solution and the naturally crystallized crystals act as the seed. Therefore, it is not particularly necessary to effect seeding. However, in order to accomplish the resolution effectively in a short period of time and to obtain D- or L-$NH_2CL.HCl$ of much enhanced optical purity, it is preferred to add an optical isomer the same as that dissolved in a greater amount as a seed.

In each of these methods (1) and (2), L-$NH_2CL·HCl$ is selectively precipitated as crystals with high selectivity from the supersaturated solution seeded with L-$NH_2CL·HCl$, and similarly, D-$NH_2CL·HCl$ is precipitated as crystals from the supersaturated solution seeded with D-$NH_2CL·HCl$. Needless to say, the optical isomer contained in excess to the other and dissolved in the supersaturated state is crystallized out in the natural crystallization of the method (2).

As a result of our research, it has been found that crystals of each of L-$NH_2CL·HCl$ and D-$NH_2CL·HCl$ take the forms of both $\beta$-type crystals and $\gamma$-type crystals. The sapce distance and diffraction intensity of each of these $\beta$-type and $\gamma$-type crystals determined by X-ray diffraction analysis are shown in the following Table 1.

Table 1

X-Ray Diffraction Spectrum Analysis of D—or L—$NH_2CL·HCl$
(powder method; Cu-K$\alpha$ rays)

| $\beta$-Type Crystal | | $\gamma$-Type Crystal | |
|---|---|---|---|
| Space Distance (A) | Diffraction Intensity | Space Distance (A) | Diffraction Intensity |
| 11.6 | VW | 13.0 | VW |
| 10.5 | VS | 11.8 | VS |
| 7.0 | W | 10.0 | VW |
| 5.91 | VW | 7.5 | W |
| 5.31 | VS | 6.61 | VW |
| 5.16 | W | 5.95 | S |
| 4.87 | VW | 5.34 | VW |
| 4.53 | VW | 4.67 | VW |
| 4.35 | VW | 4.42 | VW |
| 4.08 | S | 4.00 | S |
| 3.88 | M | 3.95 | W |
| 3.72 | S | 3.79 | W |
| 3.66 | S | 3.55 | W |
| 3.56 | VS | 3.43 | VW |
| 3.29 | W | 3.19 | VW |
| 3.22 | W | 3.01 | M |
| 2.98 | VW | 2.92 | W |
| 2.89 | M | 2.79 | W |
| 2.68 | M | 2.75 | W |

Notes to Table 1:
1. The diffraction intensity was evaluated according to the scale rated below:
VS : very strong
S : strong
M : medium
W : weak
VW : very weak
2. The measurement was conducted with the use of an X-ray diffraction meter of the model D-3F manufactured by Rigaku Denki K. K. (Japan) under the following conditions:
Measurement temperature: room temperature
Slit width: No. 2 = 1°, No. 3 = 1°, No. 4 = 0.4 mm
Scanning rate: 1°/mm
Chart speed; 1 cm/min
It has been found that when crystals of L-$NH_2CL·HCl$ or D-$NH_2CL·HCl$ having a crystal structure of the $\beta$-type are added to the supersaturated solution as the seed, L-$NH_2CL·HCl$ or D-$NH_2CL·HCl$ of much enhanced optical purity can be obtained in much better yields from the supersaturated solution. Accordingly, it is preferred that 62-type crystals of L-$NH_2CL·HCl$ or D-$NH_2CL·HCl$ are used as seed crystals for crystallization.

In this invention, the seeding need not be always effected after formation of the supersaturated solution. For instance, it is possible to adopt a method comprising adding seed crystals of D-$NH_2CL·HCl$ or L-$NH_2CL·HCl$ to a solution in which at least one of D-$NH_2CL·HCl$ and L-$NH_2CL·HCl$ is saturated, and then attaining the supersaturated state in at least one of D-$NH_2CL·HCl$ and L-$NH_2CL·HCl$. The short, it is sufficient in this invention that at the time of crystallizing out D- or L-$NH_2CL·HCl$ of enhanced optical purity the supersaturation is attained in the solution.

When the solution is maintained in the supersaturated state, precipitation of crystals of D- or L-$NH_2CL·HCl$ is allowed to begin. The decrease of the solution concentration brought about with the process of precipitation of the crystals is to be compensated by conducting any of the above-mentioned procedures adopted for preparation of the supersaturated solution, for instance, by cooling, and crystallization can be further continued. Agitation of the solution is effective for conducting the crystallization operation smoothly, and especially when the supersaturated solution has a high viscosity, agitation is very effective.

Precipitated crystals can be separated by a customary solid-liquid separating procedure, for instance, filtration or centrifugal separation. If necessary, the separated crystals are washed with a small amount of water or a solvent such as methanol and ethanol to remove the solvent attached to the crystals or the additive added for increasing the crystallization electivity. Thus, optically active $\alpha$-amino-$\epsilon$-caprolactam hydrochloride of enhanced optical purity can be obtained. Since the additive attached to the crystals has a higher solubility in such a washing solvent than $\alpha$-amino-$\epsilon$-caprolactam hydrochloride, it can readily be removed from the crystals together with the washing solvent in the state dissolved therein.

The mother liquor left after the one optical isomer of enhanced optical purity (e.g., L-$NH_2CL·HCl$ of enhanced optical purity) has been thus crystallized out, is then converted to an supersaturated solution again by adding afresh a starting mixture of D,L-$NH_2CL·HCl$, or is merely left alone, and the crystallization is repeated by optionally adding the seed of the other optical isomer (e.g., D-$NH_2CL·HCl$). Thus, there are obtained crystals of the optical isomer (e.g., D-$NH_2CL·HCl$) having an optical activity contrary to that of the isomer (e.g., L-$NH_2CL·HCl$) previously crystallized out in the form of the hydrochloride. Thus, when the above crystallization operation is repeated while keeping a good balance among the amount of precipitated crystals, the amount of the starting mixture to be supplied afresh and the amount of seed crystals, the starting mixture of D,L-$NH_2CL·HCl$ can be optically resolved continuously to obtain alternately L-$NH_2CL·HCl$ of enhanced optical purity and D-$NH_2CL·HCl$ of enhanced optical purity.

The intended optical isomer of optically active $\alpha$-amino-$\epsilon$-caprolactam hydrochloride so obtained can be converted to optically active lysine or its salt by conducting the hydrolysis according to a customary method. For instance, L-$NH_2CL·HCl$ can readily be hydrolyzed when it is treated under heating with a molar excess of hydrochloric acid, and L-lysine dihydrochloride can be obtained. When the resulting L-lysine dihydrochloride is dissolved in methanol and D- and/or L-$\alpha$-amino-$\epsilon$-caprolactam is added to the solution, L-lysine monohydrochloride is quantitatively precipitated, while the D- and/or L-$\alpha$-amino-$\epsilon$-caprolactam remains in the form of the hydrochloride in the solution to which is has been added. Therefore, if a mixture of D,L-NH$_2$Cl is added for the precipitation of L-lysine monohydrochloride, the mixture remains in the solution. Accordingly, this mixture can be used as the starting material for the optical resolution process of this invention as it is or after it has been separated from the solution.

Further, L-NH$_2$CL.HCl, for instance, can be converted to L-lysine monohydrochloride by treating it with sulfuric acid, thus hydrolyzing it to L-lysine monohydrochloride sulfate and then treating it with calcium hydroxide [Ca(OH)$_2$] to convert it into L-lysine monohydrochloride and calcium sulfate [CaSO$_4$].

The non-intended optically active isomer of α-amino-ε-caprolactam hydrochloride, for instance, D-NH$_2$CL.HCl, is subjected to racemization according to a customary method, and the resulting racemic compound can be forwarded to the optical resolution step. Accordingly, in this invention racemic α-amino-ε-caprolactam hydrochloride can be used as the starting material for the optical resolution and all of it can be converted to valuable, optically active lysine monohydrochloride. On the contrary, in the conventional recovery method as disclosed in British Pat. No. 1,256,416, racemic α-amino-ε-caprolactam hydrochloride cannot be used as the starting material and not all of it can be converted to optically active lysine monohydrochloride.

As compared with the conventional seeding method using hydrobromide or β-naphthalene-sulfonate as described hereinbefore, the process of this invention is advantageous in that it is possible to accomplish more easily the optical resolution of D,L-α-amino-ε-caprolactam while using it in a cheaper form, i.e., in the hydrochloride form, and since the optically active α-amino-ε-caprolactam can be obtained in the form of the hydrochloride, it can be directly hydrolyzed to valuable, optically active lysine hydrochloride. Further, the process of this invention is advantageous over the above-mentioned conventional diastreomer method in that such troublesome operations as separating the resulting salt of the optically active α-amino-ε-caprolactam and a resolving agent into respective compounds need not be conducted and the optical resolution can be accomplished by much simpler procedures.

As is seen from the foregoing description, the optical resolution process of this invention has various advantages over the conventional resolution methods, especially in preparing L-lysine hydrochloride.

Effects and advantages attained by the process of this invention will now be illustrated more specifically. When the results of Example 1 and Comparative Example 1 given below are, for instance, compared with each other, it is seen that even under such conditions as will provide L-α-amino-ε-caprolactam hydrochliride of an optical purity of only 86 percent if the optical resolution of a racemic mixture of D,L-NH$_2$CL.HCl is effected in the absence of D,L -amino-ε-caprolactam, Lα-amino-ε-caprolactam hydrochloride of an optical purity of 100 percent can be obtained if the optical resolution is effected in the presence of D,Lα-amino-ε-caprolactam in accordance with the process of this invention. The values of the resolution efficiency in both cases are compared with respect to the amounts of L-NH$_2$CL.HCl obtained (i.e., the values $(a-s=b \times c-s)$ obtained by reducing the amount L-NH$_2$CL.HCl seeded $(s)$ from the amount of L-NH$_2$CL.HCl calculated $(a)$ by multiplying the amount of crystallized α-amino-ε-caprolactam hydrochloride $(b)$ by the optical purity thereof $(c)$. The value obtained of L-NH$_2$HCl is 0.44 g in the case that D,L-α-amino-ε-caprolactam is absent, whereas the value obtained of L-NH$_2$CL.HCl is 0.70 g in the case that D,L-α-amino-ε-caprolactam is added. This improvement of the resolution efficiency means that when α-amino-ε-caprolactam hydrochloride is crystallized at the same crystallization yield, the hydrochloride of an optical purity of 100 percent can be obtained very easily when D,L-NH$_{XH2}$CL is made present and that when the hydrochloride of a similar optical purity is crystallized out, the presence of D,L-HN$_2$CL can enhance greatly the crystallization yield and give a much higher yield.

Such excellent effects as are attained by using D,L-α-amino-ε-caprolactam as the additive are similarly observed with respect to D,L-α-amino-ε-caprolactam acetate or sulfate or other basic substances (A) to be used in this invention (see, for instance, Examples 15 and 16). Accordingly, it is apparent that the process of this invention, which is characterized in that D,L-α-amino-ε-caprolactam, its salts (B) or the above-mentioned basic substances (A) are added in the dissolved state in the optical resolution of a racemic mixture of D,L-amino-ε-caprolactam or a mixture of D-α-amino-ε-caprolactam and L-α-amino-ε-caprolactam, exhibits excellent effects and can be practised with great industrial advantages.

This invention will now be illustrated in more detail by reference to Examples and Comparative Examples, in which the optical purity of 60-amino-ε-caprolactam hydrochloride is the value of the L-NH$_2$CL.HCl or D-NH$_2$CL.HCl content (percent) calculated from the optical rotation as measured on a 1-N hydrochloric acid solution of the product.

In Examples and Comparative Examples, the following abbreviations are used:

| | |
|---|---|
| DL—NH$_2$CL.HCl | : D,L-α-amino-ε-caprolactam hydrochloride |
| DL—NH$_2$CH | : D,L-α-amino-ε-caprolactam |
| L—NH$_2$CL.HCl | : L-α-amino-ε-caprolactam hydrochloride |
| D—NH$_2$CL.HCl | : D-α-amino-ε-caprolactam hydrochloride |
| L—NH$_2$CL | : L-α-amino-ε-caprolactam |
| D—NH$_2$CL | : D-α-amino-ε-caprolactam |
| EG | : ethyleneglycol |
| McOH | : methanol |
| EtOH | : ethanol |
| Gly | : glycerine |
| DEG | : diethyleneglycol |
| AcOEt | : ethyl acetate |
| AcOH | : acetic acid |
| DMF | : N,N-dimethylformamide |
| DMSO | : dimethylsulfoxide |
| MEK | : methylethylketone |
| PG | : propyleneglycol |
| AcN | : acetonitrile |
| n—BuNH$_2$ | : n-butylamine |
| tert—BuNH$_2$ | : tert-butylamine |
| DEA | : diethylamine |
| TEA | : triethylamine |
| HMD | : hexamethylenediamine |
| DETA | : diethylenetriamine |
| cyclo—HA | : cyclohexylamine |
| BzA | : benzylamine |
| Pr—COOH | : propionic acid |
| L-Lys·HCl | : L-lysine hydrochloride |

The abbreviated identification of the crystallizing conditions given in the Tables, for instance, 40 $\xrightarrow{20}$ 30 means that the crystallization is effected by cooling the solution from 40° to 30°C. over a period of 20 minutes.

EXAMPLE 1

10.0g of D,L-α-amino-ε-caprolactam hydrochloride (optical purity; 50 percent) and 20.0g of D,L-α-amino-ε-caprolactam were dissolved under heating into 34.0 g of a mixed solvent of ethyleneglycol and water (EG/H₂O weight ratio = 4/1). The solution was maintained at 40°C. for 10 minutes under agitation, and then 1.50 g of L-α-amino-ε-caprolactam hydrochloride was added to the solution to effect seeding. Simultaneously with the seeding, cooling of the solution was initiated, and it was cooled to 30°C. over a period of 20 minutes, following which precipitated crystals were separated by filtration. The crystals were washed with 10 g of ethanol and dried to obtain 2.20 g of L-α-amino-ε-caprolactam hydrochloride having $[\alpha]D^{20}$ of $-25.7°$ (C=3.0; 1-N hydrochloric acid solution) and an optical purity of 100 percent. Thus, the amount of the L-NH₂CL.HCl actually obtained was 0.70g (the value obtained by reducing the amount of the seed (1.50 g) from the recovered amount).

caprolactam hydrochloride was dissolved in 36.0g of a mixed solvent of ethyleneglycol and water (EG/H₂O weight ratio = 4/1). As a result 2.25 g of L-α-amino-ε-caprolactam hydrochloride having $[\alpha]_D^{20}$ of $-18.0°$ and an optical purity of 86 percent was obtained. In this case, the actually obtained amount of L-NH₂CL HCl was only 0.44 g. In view of the foregoing results, it is seen that in case the optical resolution is effected in the absence of dissolved D,L-NH₂CL, the yield of the crystallized product is very low and the optical purity of the product is extremely low.

COMPARATIVE EXAMPLES 2 and 3

In the same manner as in Comparative Example 1, the optical resolution was carried out by varying the amount of the solvent and the amount of the seed crystals as indicated in Table 2. Results of these comparative experiments as well as those of Comparative Example 1 are also shown in Table 2.

Table 2

| Ex. | Starting Material Kind | amount (g) | Basic Substance Additive Kind | amount (g) | Solvent Kind | amount (g) | Seed Kind | amount (g) | Crystallization Conditions | Crystallized Product Kind Amount (g) (Optical purity %) | Optically active product Yield (g) |
|---|---|---|---|---|---|---|---|---|---|---|---|
| 1 | DL—NH₂CL.HCl | 10.0 | DL—NH₂CL | 20.0 | EG/H₂O=4 | 34.0 | L—NH₂CL.HCl | 1.50 | 20 40→30 | L—NH₂CL.HCl 2.20(100) | 0.70 |
| 2 | DL—NH₂CL.HCl | 10.0 | DL—NH₂CL | 30.0 | EG/H₂O=4 | 29.0 | L—NH₂CL.HCl | 1.00 | 18 40→30 | L—NH₂CL.HCl 2.09(98) | 1.05 |
| 3 | DL—NH₂CL.HCl | 10.0 | DL—NH₂CL | 20.0 | EG/H₂O=4 | 34.0 | D—NH₂CL.HCl | 1.50 | 20 40→30 | D—NH₂CL.HCl 2.23(99) | 0.73 |
| 4 | DL—NH₂CL.HCl | 10.0 | DL—NH₂CL | 30.0 | EG/H₂O=4 | 30.0 | L—NH₂CL.HCl | 0.10 | 20 40→34 | L—NH₂CL.HCl 0.63(98) | 0.52 |
| 5 | DL—NH₂CL.HCl | 10.0 | DL—NH₂CL | 20.0 | EG/H₂O=4 | 34.0 | L—NH₂CL.HCl | 0.10 | 20 40→34 | L—NH₂CL.HCl 0.60(97) | 0.48 |
| 6 | DL—NH₂CL.HCl | 10.0 | DL—NH₂CL | 10.0 | EG/H₂O=4 | 35.0 | L—NH₂CL.HCl | 0.10 | 24 40→34 | L—NH₂CL.HCl 0.61(91) | 0.46 |
| 7 | DL—NH₂CL.HCl | 10.0 | DL—NH₂CL | 8.0 | EG/H₂O=4 | 35.0 | L—NH₂CL.HCl | 0.10 | 20 40→34 | L—NH₂CL.HCl 0.60(86) | 0.42 |
| 8 | DL—NH₂CL.HCl | 10.0 | DL—NH₂CL | 5.0 | EG/H₂O=4 | 35.0 | L—NH₂CL.HCl | 0.10 | 27 40→34 | L—NH₂CL.HCl 0.49(87) | 0.33 |
| 9 | DL—NH₂CL.HCl L—NH₂CL.HCl | 10.0 1.0 | DL—NH₂CL | 30.0 | EG/H₂O=4 | 30.0 | — | — | 25 45→30 | L—NH₂CL.HCl 2.07(95) | 0.97 |
| *1 | DL—NH₂CL.HCl | 10.0 | — | — | EG/H₂O=4 | 36.0 | L—NH₂CL.HCl | 1.50 | 20 40→30 | L—NH₂Cl.HCl 2.25(86) | 0.44 |
| *2 | DL—NH₂CL.HCl | 10.0 | — | — | EG/H₂O=4 | 36.0 | L—NH₂CL.HCl | 1.50 | 18 40→30 | L—NH₂Cl.HCl 2.02(78) | 0.58 |
| *3 | DL—NH₂CL.HCl | 10.0 | — | — | EG/H₂O=4 | 38.0 | L—NH₂CL.HCl | 0.10 | 27 40→34 | L—NH₂Cl.HCl 0.37(85) | 0.21 |

*Comparative

EXAMPLES 2 to 9

In the same manner as in Example 1, the optical resolution of D,L-NH₂CL.HCl was carried out by varying the amount of D,L-NH₂CL dissolved in the solvent and the amount of L-NH₂CL.HCl added as the seed as indicated in Table 2. Crystallization conditions and results are shown in Table 2 where results of Example 1 are also shown. In Example 9, no seed crystals were added and crystallization was allowed to advance spontaneously.

COMPARATIVE EXAMPLE 1

Optical resolution of D,L-α-amino-ε-caprolactam hydrochloride was carried out in the same manner as in Example 1 except that only 10.0 g of D,L-α-amino-ε-

EXAMPLE 10

40.0g of D,L-α-amino-ε-caprolactam hydrochloride was dissolved in 138.0 g of a mixed solvent of n-butylamine and methanol (n-BuNH₂/.MeOH weight ratio = 18/120) under heating.

The solution was maintained at 40°C. for 20 minutes under agitation, and then 1.0g of L-α-amino-ε-caprolactam hydrochloride was added to the solution as the seed. Simultaneously with the seeding, cooling of the solution was initiated. The solution was cooled to 22°C. over a period of 30 minutes, and precipitated crystals were collected by filtration.

The recovered crystals were washed with a small quantity of ethanol and dried to obtain 1.52 g of L-α-amino-ε-caprolactam hydrochloride having an optical purity of 99 percent ($[\alpha]D^{20} = -25.2°$, C=3, 1-N hydrochloric acid).

EXAMPLES 11 to 28

In the same manner as in Example 10, the optical resolution of D,L-$NH_2CL.HCl$ was carried out by employing a basic substance indicated in Table 3 instead of n-butylamine. Conditions and results are shown in Table 3 together with the results of Example 10.

COMPARATIVE EXAMPLES 4 to 7

In the same manner as in Example 10, the optical resolution was carried out by changing the kind of the basic substance to be used under conditions indicated in Table 3. Results are shown in Table 3.

When the results of Examples 10 to 28 are compared with results of Comparative Examples 4 to 7, it is seen that in case a basic substance having a $pK_b$ value of not greater than 5, preferably not greater than 4, is used as the additive, D- or L-$NH_2CL.HCl$ of high optical purity can be obtained in high yield, whereas in case a basic substance having a $pK_b$ value exceeding 5 is used as the additive, only D- or L-$NH_2CL.HCl$ of a low optical purity is obtained in a low yield.

Table 3

| Ex. | Starting Material Kind | amount (g) | Basic Substance Additive Kind | pKb | amount (g) | Solvent Kind | amount (g) | Seed Kind | amount (g) | Crystallization Conditions | Crystallized Product Kind | amount (g) | Optical purity (%) |
|---|---|---|---|---|---|---|---|---|---|---|---|---|---|
| 10 | DL—$NH_2CL.HCl$ | 40.0 | n—$BuNH_2$ | 3.4 | 18.0 | MeOH | 12.0 | L—$NH_2CL.HCl$ | 1.0 | 30 40→22 | L—$NH_2CL.HCl$ | 1.52 | 99 |
| 11 | DL—$NH_2CL.HCl$ | 40.0 | n—$BuNH_2$ | 3.4 | 20.0 | MeOH | 100.0 | D—$NH_2CL.HCl$ | 1.0 | 10 40→37 | D—$NH_2CL.HCl$ | 2.32 | 91 |
| 12 | DL—$NH_2CL.HCl$ | 3.0 | n—$BuNH_2$ | 3.4 | 1.1 | EG/$H_2O$=4 | 3.9 | L—$NH_2CL.HCl$ | 0.1 | 12 40→30 | L—$NH_2CL.HCl$ | 0.16 | 100 |
| 13 | DL—$NH_2CL.HCl$ | 3.0 | n—$BuNH_2$ | 3.4 | 1.1 | EG/$H_2O$=4 | 3.9 | D—$NH_2CL.HCl$ | 0.1 | 20 40→27 | D—$NH_2CL.HCl$ | 0.24 | 94 |
| 14 | DL—$NH_2CL.HCl$ | 3.0 | tert-$BuNH_2$ | 3.5 | 3.0 | MeOH $H_2O$=97/3 | 12.0 | L—$NH_2CL.HCl$ | 0.15 | 5 28→28 | L—$NH_2CL.HCl$ | 0.59 | 80 |
| 15 | DL—$NH_2CL.HCl$ | 4.0 | DEA | 3.1 | 1.3 | MeOH | 11.0 | L—$NH_2CL.HCl$ | 0.1 | 13 40→35 | L—$NH_2CL.HCl$ | 0.24 | 85 |
| 16 | DL—$NH_2CL.HCl$ | 3.0 | TEA | 3.1 | 0.8 | MeOH $H_2O$=9 | 14.9 | L—$NH_2CL.HCl$ | 0.1 | 5 40→38 | L—$NH_2CL.HCl$ | 0.27 | 80 |
| 17 | DL—$NH_2CL.HCl$ | 3.0 | HMD | 3.2 | 0.8 | MeOH/$H_2O$=3/2 | 4.0 | L—$NH_2CL.HCl$ | 0.2 | 10 30→29 | L—$NH_2CL.HCl$ | 0.44 | 78 |
| 18 | DL—$NH_2CL.HCl$ | 3.0 | HMD | 3.2 | 1.0 | MeOH/$H_2O$=3/2 | 4.5 | D—$NH_2CL.HCl$ | 0.2 | 8 30→30 | D—$NH_2CL.HCl$ | 0.32 | 91 |
| 19 | DL—$NH_2CL.HCl$ | 3.0 | DETA | 4.1 | 1.2 | EcOH/$H_2O$=1 | 3.0 | L—$NH_2CL.HCl$ | 0.1 | 5 30→29 | L—$NH_2CL.HCl$ | 0.25 | 85 |
| 20 | DL—$NH_2CL.HCl$ | 3.0 | cyclo.HA | 3.4 | 1.2 | EcOH/$H_2O$=1 | 3.5 | L—$NH_2CL.HCl$ | 0.1 | 5 33→33 | L—$NH_2CL.HCl$ | 0.33 | 75 |
| 21 | DL—$NH_2CL.HCl$ | 3.0 | cyclo.HA | 3.4 | 1.4 | EcOH/$H_2O$=1 | 3.7 | D—$NH_2CL.HCl$ | 0.1 | 20 35→33 | D—$NH_2CL.HCl$ | 0.23 | 93 |
| 22 | DL—$NH_2CL.HCl$ | 3.0 | BzA | 4.7 | 1.9 | MeOH | 11.0 | L—$NH_2 CL.HCl$ | 0.1 | 15 40→33 | L—$NH_2CL.HCl$ | 0.21 | 80 |
| 23 | DL—$NH_2CL.HCl$ | 4.0 | Piperazine | 4.2 | 1.5 | MeOH | 11.0 | L—$NH_2CL.HCl$ | 0.1 | 20 40→30 | L—$NH_2CL.HCl$ | 0.20 | 92 |
| 24 | DL—$NH_2CL.HCl$ | 4.0 | Piperidine | 2.9 | 1.5 | MeOH | 11.0 | L—$NH_2CL.HCl$ | 0.1 | 16 40→32 | L—$NH_2CL.HCl$ | 0.19 | 95 |
| 25 | DL—$NH_2CL.HCl$ | 4.0 | LiOH | 0 | 0.4 | MeOH/$H_2O$=9 | 6.0 | L—$NH_2CL.HCl$ | 090.01 | 20 42→34 | L—$NH_2CL.HCl$ | 0.10 | 95 |
| 26 | DL—$NH_2CL.HCl$ | 4.0 | NaOH | 0 | 0.7 | MeOH/$H_2O$=9 | 5.8 | L—$NH_2CL.HCl$ | 090.01 | 20 40→30 | L—$NH_2CL.HCl$ | 0.13 | 98 |
| 27 | DL—$NH_2CL.HCl$ | 4.0 | Ca(OH)$_2$ | 2.4 | 1.3 | MeOH/$H_2O$=9 | 5.8 | L—$NH_2CL.HCl$ | 090.01 | 20 40→30 | L—$NH_2CL.HCl$ | 0.10 | 93 |
| 28 | DL—$NH_2CL.HCl$ | 3.0 | $NH_4OH$ | 4.8 | 0.5 | EG/$H_2O$=4 | 9.0 | L—$NH_2CL.HCl$ | 0.1 | 15 40→35 | L—$NH_2CL.HCl$ | 0.25 | 73 |
| *4 | DL—$NH_2CL.HCl$ | 1.0 | $NH_2NH_2$ | 6.1 | 0.32 | EG/$H_2O$=4 | 3.0 | L—$NH_2CL.HCl$ | 0.1 | 20 40→33 | L—$NH_2CL.HCl$ | 0.26 | 69 |
| *5 | DL—$NH_2CL.HCl$ | 1.0 | $NH_2OH$ | 8.0 | 0.39 | EG/$H_2O$=4 | 3.5 | L—$NH_2CL.HCl$ | 0.1 | 15 40→35 | L—$NH_2CL.HCl$ | 0.28 | 65 |
| *6 | DL—$NH_2CL.HCl$ | 1.0 | Piridine | 8.8 | 0.42 | MeOH | 12.5 | L—$NH_2CL.HCl$ | 0.025 | 10 40→39 | L—$NH_2CL.HCl$ | 0.23 | 57 |
| *7 | DL—$NH_2CL.HCl$ | 1.0 | Aniline | 9.4 | 0.40 | MeOH | 12.6 | L—$NH_2CL.HCl$ | 0.025 | 15 40→38 | L—$NH_2CL.HCl$ | 0.22 | 56 |

*Comparative

EXAMPLE 29

10.0 g of D,L-α-amino-ε-caprolactam hydrochloride and 10.0 g of D,L-α-amino-ε-caprolactam acetate were dissolved in 46.0 g of a mixed solvent of ethyleneglycol and water (EG/H$_2$O weight ratio = 8/2) under heating.

The solution was maintained at 40.0°C. for 10 minutes, and 0.1 g of L-α-amino-ε-caprolactam hydrochloride was added as the seed to the solution. Simultaneously with the seeding, cooling of the solution was initiated, and the solution was cooled to 30°C. over a period of 13 minutes. Precipitated crystals were recovered by filtration, washed with 10 g of cooled methanol and dried to obtain 0.64 g of L-α-amino-ε-caprolactam hydrochloride having an optical purity of 86 percent.

EXAMPLES 30 to 37

In the same manner as in Example 29, the optical resolution of D,L-α-amino-ε-caprolactam hydrochloride was carried out by employing a salt of D,L-α-amino-ε-caprolactam as indicated in Table 4 instead of D,L-α-amino-ε-caprolactam acetate. Conditions and results are shown in Table 4, where the results of Example 29 are also illustrated.

EXAMPLE 38

10.0 g of D,L-α-amino-ε-caprolactam hydrochloride and 50.0 g of D,L-α-amino-ε-caprolactam were dissolved under heating into 10.0 g of water.

The solution was maintained at 40°C. for 10 minutes under agitation, and then 1.0 g of D-α-amino-ε-caprolactam hydrochloride was added to the solution.

Simultaneously with the seeding, cooling of the solution as the seed was initiated and the solution was cooled to 25.5°C. over a period of 20 minutes. Precipitated crystals were recovered by filtration, washed with 10 g of ethanol and dried to obtain 2.48 g of D-α-amino-ε-caprolactam hydrochloride having $[\alpha]D_{20}$ of + 22.2° and an optical purity of 93 percent.

Table 4 (1)

| | Starting Material Kind | Amount (g) | Basic Substance Additive Kind | Amount (g) | Solvent Kind | Amount (g) | Seed Kind | Amount (g) | Crystallization conditions |
|---|---|---|---|---|---|---|---|---|---|
| Example 29 | DL—NH$_2$CL.HCl | 10.0 | DL—NH$_2$CL.AcOH | 10.0 | EG/H$_2$O=4 | 46.0 | L—NH$_2$CL.HCl | 0.1 | 13  40→30 |
| Example 30 | DL—NH$_2$CL.HCl | 10.0 | DL—NH$_2$CL.H$_2$SO$_4$ | 18.0 | EG/H$_2$O=4 | 43.0 | L—NH$_2$CL.HCl | 0.1 | 15  42→32 |
| Example 31 | DL—NH$_2$CL.HCl | 10.0 | DL—NH$_2$CL.AcOH | 15.0 | MeOH/H$_2$O=4 | 50.0 | L—NH$_2$CL.HCl | 0.1 | 20  39→32 |
| Example 32 | DL—NH$_2$CL.HCl | 10.0 | DL—NH$_2$CL.HCOOH | 15.0 | MeOH/H$_2$O=4 | 50.0 | L—NH$_2$CL.HCl | 0.1 | 20  40→30 |
| Example 33 | DL—NH$_2$CL.HCl | 10.0 | DL—NH$_2$CL.P-rCOOH | 15.0 | EG/H$_2$O=4 | 55.0 | L—NH$_2$CL.HCl | 0.1 | 18  40→30 |
| Example 34 | DL—NH$_2$CL.HCl | 10.0 | DL—NH$_2$CL.H$_2$CO$_3$ | 20.0 | EG/H$_2$O=4 | 32.0 | L—NH$_2$CL.HCl | 0.1 | 16  40→35 |
| Example 35 | DL—NH$_2$CL.HCl | 10.0 | DL—NH$_2$CL  L—Lys.HCl | 20.0  2.0 | EG/H$_2$O=4 | 34.0 | L—NH$_2$CL.HCl | 0.1 | 20  40→31 |
| Example 36 | DL—NH$_2$CL.HCl | 10.0 | DL—NH$_2$CL  L—Lys.HCl | 20.0  2.0 | EG/H$_2$O=4 | 34.0 | L—NH$_2$CL.HCl | 0.1 | 18  40→32 |
| Example 37 | DL—NH$_2$CL.HCl | 10.0 | DL—NH$_2$CL  L—Lys.HCl | 50.0  10.0 | H$_2$O | 18.0 | L—NH$_2$CL.HCl | 1.0 | 20  40→23 |

Table 4 (2)

| | Crystallized Product Kind | Amount(g) | Optical purity (%) |
|---|---|---|---|
| Example 29 | L—NH$_2$CL.HCl | 0.64 | 86 |
| Example 30 | L—NH$_2$CL.HCl | 0.61 | 88 |
| Example 31 | L—NH$_2$CL.HCl | 0.60 | 85 |
| Example 32 | L—NH$_2$CL.HCl | 0.63 | 84 |
| Example 33 | L—NH$_2$CL.HCl | 0.70 | 82 |
| Example 34 | L—NH$_2$CL.HCl | 0.79 | 80 |
| Example 35 | L—NH$_2$CL.HCl | 1.22 | 91 |
| Example 36 | L—NH$_2$CL.HCl | 0.83 | 97 |
| Example 37 | L—NH$_2$CL.HCl | 2.92 | 99 |

EXAMPLES 39 TO 71 AND COMPARATIVE EXAMPLES 8 TO 10

In the same manner as in Example 38, the optical resolution of D,L-α-amino-ε-caprolactam hydrochloride was carried out by employing a solvent as indicated in Table 5 instead of the water solvent. Conditions and results are shown in Table 5, where the results of Example 38 are also given. As comparative examples, the optical resolution was also carried out in the absence of an added basic substance. The results of such comparative experiments are also shown in Tables 5 and 6.

Table 5 (1)

| | Starting Material Kind | Amount (g) | Basic Substance Additive Kind | Amount (g) | Solvent Kind | Amount (g) | Seed Kind | Amount (g) | Crystallization conditions |
|---|---|---|---|---|---|---|---|---|---|
| Example 38 | DL—NH₂CL.HCl | 10.0 | DL—NH₂CL | 50.0 | H₂O | 10.0 | D—NH₂CL.HCl | 1.0 | 20<br>40→25.5 |
| Example 39 | DL—NH₂CL.HCl | 10.0 | DL—NH₂CL | 20.0 | H₂O | 13.0 | L—NH₂CL.HCl | 1.0 | 15<br>40→29 |
| Example 40 | DL—NH₂CL.HCl | 10.0 | DL—NH₂CL | 80.0 | MeOH | 48.0 | L—NH₂CL.HCl | 1.0 | 30<br>40→27 |
| Example 41 | DL—NH₂CL.HCl | 10.0 | DL—NH₂CL | 50.0 | MeOH | 62.0 | L—NH₂CL.HCl | 1.0 | 10<br>40→31 |
| Example 42 | DL—NH₂CL.HCl | 10.0 | DL—NH₂CL | 20.0 | MeOH | 115.0 | L—NH₂CL.HCl | 0.10 | 25<br>40→26 |
| Example 43 | DL—NH₂CL.HCl | 10.0 | DL—NH₂CL | 5.0 | EG | 47.0 | L—NH₂CL.HCl | 0.10 | 20<br>40→30 |
| Example 44 | DL—NH₂CL.HCl | 10.0 | DL—NH₂CL | 5.0 | DEG | 100.0 | L—NH₂CL.HCl | 0.10 | 30<br>50→40 |
| Example 45 | DL—NH₂CL.HCl | 10.0 | DL—NH₂CL | 5.0 | Glycerine | 42.0 | L—NH₂CL.HCl | 0.10 | 15<br>40→35 |
| Example 46 | DL—NH₂CL.HCl | 10.0 | DL—NH₂CL | 10.0 | Acetone | 3000 | L—NH₂CL.HCl | 0.10 | 40<br>30→26 |
| Example 47 | DL—NH₂CL.HCl | 10.0 | DL—NH₂CL | 10.0 | AcOEt | 3700 | L—NH₂CL.HCl | 0.10 | 30<br>55→45 |
| Example 48 | DL—NH₂CL.HCl | 10.0 | DL—NH₂CL | 10.0 | DMF | 3500 | L—NH₂CL.HCl | 0.10 | 40<br>55→47.5 |
| Example 49 | DL—NH₂CL.HCl | 10.0 | DL—NH₂CL | 10.0 | DMSO | 130 | L—NH₂CL.HCl | 0.10 | 60<br>55→42.5 |

Table 5 (2)

| | Crystallized Product Kind | Amount (g) | Optical purity (%) |
|---|---|---|---|
| Example 38 | D—NH₂Cl.HCl | 2.48 | 93 |
| Example 39 | L—NH₂Cl.HCl | 1.94 | 94 |
| Example 40 | L—NH₂Cl.HCl | 2.32 | 100 |
| Example 41 | L—NH₂Cl.HCl | 2.19 | 99 |
| Example 42 | L—NH₂Cl.HCl | 0.46 | 96 |
| Example 43 | L—NH₂Cl.HCl | 0.42 | 88 |
| Example 44 | L—NH₂Cl.HCl | 0.57 | 87 |
| Example 45 | L—NH₂Cl.HCl | 0.50 | 83 |
| Example 46 | L—NH₂Cl.HCl | 0.37 | 86 |
| Example 47 | L—NH₂Cl.HCl | 0.38 | 85 |
| Example 48 | L—NH₂Cl.HCl | 0.34 | 82 |
| Example 49 | L—NH₂Cl.HCl | 0.42 | 79 |

Table 6 (2)

| | Crystallized product Kind | Amount(g) | Optical Purity(%) |
|---|---|---|---|
| Example 50 | L—NH₂CL.HCl | 1.03 | 98 |
| Example 51 | L—NH₂CL.HCl | 2.53 | 85 |
| Example 52 | L—NH₂CL.HCl | 0.46 | 95 |
| Example 53 | L—NH₂CL.HCl | 0.46 | 84 |
| Example 54 | L—NH₂CL.HCl | 1.82 | 96 |
| Example 55 | L—NH₂CL.HCl | 2.35 | 89 |
| Example 56 | D—NH₂CL.HCl | 3.86 | 94 |
| Example 57 | L—NH₂CL.HCl | 1.99 | 98 |
| Example 58 | D—NH₂CL.HCl | 1.02 | 90 |
| Example 59 | L—NH₂CL.HCl | 3.41 | 88 |
| Example 60 | L—NH₂CL.HCl | 1.83 | 90 |
| Example 61 | L—NH₂CL.HCl | 1.98 | 93 |
| Example 62 | L—NH₂CL.HCl | 0.42 | 91 |
| Example 63 | L—NH₂CL.HCl | 0.58 | 92 |

Table 6 (1)

| | Starting Material Kind | Amount (g) | Basic Substance Additive Kind | Amount (g) | Solvent Kind | Amount (g) | Seed Kind | Amount (g) | Crystallization Conditions |
|---|---|---|---|---|---|---|---|---|---|
| Example 50 | DL—NH₂CL.HCl | 10.0 | DL—NH₂CL | 20.0 | H₂O/MeOH=4 | 17.0 | L—NH₂CL.HCl | 0.5 | 20<br>30→22 |
| Example 51 | DL—NH₂CL.HCl | 10.0 | DL—NH₂CL | 30.0 | H₂O/MeOH=3/2 | 20.0 | L—NH₂CL.HCl | 1.0 | 15<br>30→23 |
| Example 52 | DL—NH₂CL.HCl | 10.0 | DL—NH₂CL | 20.0 | MeOH/H₂O=9 | 60.0 | L—NH₂CL.HCl | 0.1 | 15<br>40→37 |
| Example 53 | DL—NH₂CL.HCl | 10.0 | DL—NH₂CL | 20.0 | MeOH/H₂O=4 | 40.0 | L—NH₂CL.HCl | 0.1 | 18<br>37→36 |
| Example 54 | DL—NH₂CL.HCl | 10.0 | DL—NH₂CL | 50.0 | MeOH/H₂O=55/45 | 27.0 | L—NH₂CL.HCl | 1.0 | 20<br>40→30 |
| Example 55 | DL—NH₂CL.HCl | 10.0 | DL—NH₂CL | 30.0 | EfOH/H₂O=55/45 | 30.0 | L—NH₂CL.HCl | 1.0 | 15<br>30→23 |
| Example 56 | DL—NH₂CL.HCl | 20.0 | DL—NH₂CL | 60.0 | H₂O/Aceton=55/45 | 56.0 | D—NH₂CL.HCl | 2.0 | 15<br>30→27 |
| Example 57 | DL—NH₂CL.HCl | 10.0 | DL—NH₂CL | 30.0 | Aceton/H₂O=55/45 | 32.0 | L—NH₂CL.HCl | 1.0 | 15<br>30→27 |
| Example 58 | DL—NH₂CL.HCl | 10.0 | DL—NH₂CL | 20.0 | MEK/H₂O=9 | 120.0 | D—NH₂CL.HCl | 0.5 | 20<br>40→30 |
| Example 59 | DL—NH₂CL.HCl | 10.0 | DL—NH₂CL | 30.0 | AcOH/H₂O=3/2 | 59.0 | L—NH₂CL.HCl | 1.0 | 5<br>40→37 |
| Example 60 | DL—NH₂CL.HCl | 10.0 | DL—NH₂CL | 20.0 | H₂O/AcOH=9 | 18.0 | L—NH₂CL.HCl | 1.0 | 20<br>30→23 |
| Example 61 | DL—NH₂CL.HCl | 10.0 | DL—NH₂CL | 20.0 | H₂O/EG=9 | 15.0 | L—NH₂CL.HCl | 1.0 | 20<br>40→30 |
| Example 62 | DL—NH₂CL.HCl | 10.0 | DL—NH₂CL | 10.0 | EG/H₂O=7/3 | 30.0 | L—NH₂CL.HCl | 0.1 | 20<br>40→30 |
| Example 63 | DL—NH₂CL.HCl | 10.0 | DL—NH₂CL | 10.0 | PG/H₂O=4 | 53.0 | L—NH₂CL.HCl | 0.1 | 30<br>40→34 |

Table 6 (3)

| | Starting Material | | Basic Substance Additive | | Solvent | | Seed | | Crystallization Condition |
|---|---|---|---|---|---|---|---|---|---|
| | Kind | Amount (g) | Kind | Amount (g) | Kind | Amount (g) | Kind | Amount (g) | |
| Example 64 | DL—NH₂CL.HCl | 10.0 | DL.—NH₂CL | 10.0 | Gly/H₂O=7/3 | 30.0 | L.—NH₂CL.HCl | 0.1 | 15, 40→36 |
| Example 65 | DL—NH₂CL.HCl | 10.0 | DL.—NH₂CL | 20.0 | H₂O/DMF=55/45 | 23.0 | L—NH₂CL.HCl | 1.0 | 20, 40→32 |
| Example 66 | DL—NH₂CL.HCl | 10.0 | DL.—NH₂CL | 30.0 | DMF/H₂O=17/5 | 82.0 | L.—NH₂Cl.HCl | 1.0 | 15, 30→25 |
| Example 67 | DL—NH₂CL.HCl | 10.0 | DL.—NH₂CL | 30.0 | DMF/H₂O=3/2 | 23.0 | L—NH₂CL.HCl | 1.0 | 10, 36→33 |
| Example 68 | DL—NH₂CL.HCl | 10.0 | DL.—NH₂CL | 50.0 | MeOH/DMF=7/3 | 73.0 | L—NH₂CL.HCl | 1.0 | 20, 38→30 |
| Example 69 | DL—NH₂CL.HCl | 1.0 | DL.—NH₂Cl | 3.0 | DMSO/H₂O=3/2 | 2.3 | L.—NH₂CL.HCl | 0.1 | 3, 36→33 |
| Example 70 | DL.—NH₂CL.HCl | 1.0 | DL.—NH₂CL | 3.0 | Dioxane/H₂O=3/2 | 4.0 | L.—NH₂CL.HCl | 0.1 | 10, 31→28 |
| Example 71 | DL.—NH₂CL.HCl | 1.0 | DL.—NH₂CL | 3.0 | AcN/H₂O=3/2 | 3.0 | L.—NH₂CL.HCl | 0.1 | 10, 40→36 |
| Comparative Example 8 | DL.—NH₂CL.HCl | 1.0 | — | — | EG | 49.0 | L—NH₂CL.HCl | 0.1 | 18, 40→36 |
| Comparative Example 9 | DL.—NH₂CL.HCl | 1.0 | — | — | EG/H₂O=4 | 55.0 | L.—NH₂CL.HCl | 0.1 | 30, 40→34 |
| Comparative Example 10 | DL.—NH₂CL.HCl | 1.0 | — | — | Gly/H₂O=7/3 | 32.0 | L.—NH₂CL.HCl | 0.1 | 15, 40→36 |

Table 6 (4)

| | Crystallized product | | |
|---|---|---|---|
| | Kind | Amount (g) | Optical Purity (%) |
| Example 64 | L—NH₂CL.HCl | 0.53 | 89 |
| Example 65 | L—NH₂CL.HCl | 2.35 | 88 |
| Example 66 | L—NH₂CL.HCl | 1.96 | 93 |
| Example 67 | L—NH₂CL.HCl | 3.94 | 72 |
| Example 68 | L—NH₂CL.HCl | 2.05 | 100 |
| Example 69 | L—NH₂CL.HCl | 0.39 | 72 |
| Example 70 | L—NH₂Cl.HCl | 0.16 | 98 |
| Example 71 | L—NH₂CL.HCl | 0.15 | 96 |
| Comparative Example 8 | L—NH₂CL.HCl | 0.14 | 78 |
| Comparative Example 9 | L—NH₂CL.HCl | 0.52 | 87 |
| Comparative Example 10 | L—NH₂Cl.HCl | 0.50 | 81 |

EXAMPLE 72

The filtrate left after removal of precipitated crystals in Example 1 was incorporated with 1.40 g of D,L-α-amino-ε-caprolactam hydrochloride and the hydrochloride was dissolved in the filtrate by heating. Then, 0.80 g of D-α-amino-ε-caprolactam hydrochloride was added to this solution to effect seeding. Crystallization and post-treatments were carried out in the same manner as in Example 1 to obtain 2.14 g of D-α-amino-ε-caprolactam hydrochloride having an optical purity of 100 percent. The actually obtained amount of D-NH₂CL.HCl exclusive of the seed was 1.34 g.

As is seen from the results of this Example, in accordance with the process of this invention, alternate crystallization procedures of crystallizing out the L-isomer at first and then crystallizing out the D-isomer can be conducted repeatedly and very effectively, and therefore, L-NH₂CL.HCl and D-NH₂CL.HCl can be prepared with great industrial advantages. In case only industrially valuable L-NH₂CL.HCl is wanted, D-NH₂CL.HCl obtained by the above optical resolution procedures is subjected to racemization and the resulting racemic D, L-NH₂CL.HCl is used as the starting material for the next cycle of the optical resolution.

EXAMPLE 73

46.0 g of D.L-α-amino-ε-caprolactam hydrochloride, 4 g of L-α-amino-ε-caprolactam hydrochloride and 250 g of D,L-α-amino-ε-caprolactam were dissolved in 280 g of methanol under heating. The solution was maintained at 40°C. for 10 minutes under agitation, and then 5.0 g of L-α-amino-ε-caprolactam hydrochloride was added to the solution to effect seeding. Simultaneously with the seeding, cooling of the solution was initiated, and the solution was cooled to 30°C. over a period of 20 minutes, Precipitated crystals were recovered by filtration (the filtrate is designated as "mother liquor 1"). The recovered crystals were washed with 20 ml of methanol and dried to obtain 15.02 g of L-α-amino-ε-caprolactam hydrochloride having an optical purity of 100 percent. Accordingly, the amount of L-NH₂CL.HCl actually obtained by the optical resolution was 6.02 g.

Then, 12.0 g of D,L-α-amino-ε-caprolactam hydrochloride was added afresh and dissolved into the mother liquor 1 under heating. The solution was maintained at 40°C. for 10 minutes under agitation, and then 3.0 g of D-α-amino-ε-caprolactam hydrochloride was added as the seed to the solution. Simultaneously with the seeding, cooling of the solution was initiated and the solution was cooled to 30°C. over a period of 20 minutes. Precipitated crystals were recovered by filtration (the filtrate is designated as "mother liquor 2"). The crystals were washed with 20 ml of methanol and dried to obtain 15.05 g of D-α-amino-ε-caprolactam hydrochloride having an optical purity of 100 percent. Accordingly, the amount of D-NH₂CL.HCl actually obtained by the optical resolution was 12.05 g.

The mother liquor 2 was treated in the same manner as described above, and the mother liquor 3 left after removal of precipitated crystals was also similarly treated. These procedures were repeated. All the results are shown in Table 7.

As is seen from the results of this Example, in accordance with the process of this invention, L-NH₂CL.HCl of an optical purity of 100 percent and D-NH₂CL.HCl of an optical purity of 100 percent can be obtained alternately from a mixture of L-NH₂CL.HCl and D-NH₂CL.HCl in a continuous manner. Therefore, if the process of this invention is practised in combination with the racemization step, only L-NH₂CL.HCl or only D-NH₂CL.HCl can be obtained with great industrial advantages starting from a mixture of L-α-amino-ε-caprolactam hydrochloride and D-α-amino-ε-caprolactam hydrochloride.

Table 7 (1)

| Optical Resolution | Starting Material | | Basic Substance | | Solvent | | Seed | | Crystallization Condition |
|---|---|---|---|---|---|---|---|---|---|
| | Kind | Amount (g) | Kind | Amount (g) | Kind | Amount (g) | Kind | Amount (g) | |
| First Operation | DL—NH₂CL.HCl<br>L—NH₂CL.HCl | 46.0<br>4.0 | DL—NH₂CL | 250 | Methanol | 280 | L—NH₂CL.HCl | 5.0 | 20<br>40→30 |
| Second Operation | Mother Liquor 1<br>DL—NH₂Cl.HCl | 12.0 | — | | — | | D—NH₂CL.HCl | 3.0 | 20<br>40→30 |
| Third Operation | Mother Liquor 2<br>DL—NH₂— | 12.0 | | | | | L—NH₂CL.HCl | 3.0 | 20<br>40→30 |
| Forth Operation | Mother Liquor 3<br>DL—NH₂CL.HCl | 12.0 | — | | — | | D—NH₂CL.HCl | 3.0 | 20<br>40→30 |
| Fifth Operation | Mother Liquor 4<br>DL—NH₂CL.HCl | 12.0 | — | | — | | L—NH₂CL.HCl | 3.0 | 20<br>40→30 |
| Sixth Operation | Mother Liquor 5<br>DL—NH₂CL.HCl | 12.0 | — | | — | | D—NH₂CL.HCl | 3.0 | 20<br>40→30 |

Table 7 (2)

| Crystallized product | | Optically Active Product |
|---|---|---|
| Kind | Amount (Optical Purity (%)) | Amount obtained (g) |
| L—NH₂CL.HCl | 15.02 (100) | 6.02 |
| D—NH₂CL.HCl | 15.05 (100) | 12.05 |
| L—NH₂CL.HCl | 14.01 (100) | 11.01 |
| D—NH₂CL.HCl | 15.03 (100) | 12.03 |
| L—NH₂CL.HCl | 15.59 (100) | 12.59 |
| D—NH₂CL.HCl | 14.91 (100) | 11.91 |

What we claim is:

1. A process for the recovery of D- or L-α-amino-ε-caprolactam hydrochloride of enhanced optical purity from a mixture of D- and L-α-amino-ε-caprolactam hydrochloride dissolved in a polar solvent selected from the group consisting of water, mono- to tri-hydric aliphatic alcohols having less than 7 carbon atoms; aliphatic ketones having less than 7 carbon atoms; aliphatic carboxylic acids having less than 11 carbon atoms and the lower alkyl esters thereof; N-unsubstituted and N-substituted amides having less than 7 carbon atoms; lower alkyl sulfoxides having less than 5 carbon atoms; cyclic ethers having less than 5 carbon atoms; aliphatic nitriles having less than 5 carbon atoms; and mixtures thereof, the said solution containing (1), dissolved therein, at least one of the said D-α-amino-ε-caprolactam hydrochloride and L-α-amino-ε-caprolactam hydrochloride in the supersaturated state and (2), in addition to the said D- and L-α-amino-ε-caprolactam hydrochloride, an additive selected from at least one of the group consisting essentially of A. a basic substance having a $pK_b$ value of not greater than 5 as measured at 25°C. in water or a substance having a basicity equivalent thereto, said substance being selected from the group consisting of aliphatic amines having not more than 12 carbon atoms; aryl lower alkyl amines; alicyclic amines having not more than 6 carbom atoms in the ring; pyrrolidine; piperidine; 2-methyl-piperidine, piperazine; α-amino-ε-caprolactam; α-amino-laurylolactam; melam; melem; alkali metal hydroxides; alkaline earth metal hydroxides; tetra-lower alkyl ammonium hydroxides; alkali metal lower alkoxides; alkali metal salts of monobasic lower aliphatic acids, alkali metal salt of benzoic acid; alkali metal salt of salicyclic acid; alkali metal salt of dibasic aliphatic acids having 4-6 carbon atoms; ammonia and guanidine, and B. a salt of a mixture of D- and L-α-amino-ε-caprolactam having a solubility in the said polar solvent which is greater than the solubility of D- and L-α-amino-ε-caprolactam hydrochloride in the said polar solvent, said salt being selected from the group consisting of salts of a monobasic aliphatic carboxylic acid having 1–4 carbon atoms; a monobasic aryl carboxylic acid; a dibasic lower aliphatic acid having 2–6 carbon atoms; a hydroxylated dibasic aliphatic acid having 2–6 carbon atoms; and an amino acid having not more than 4 carbon atoms, with D-NH₂CL or L-NH₂Cl, or a mixture thereof;

in an amount of at least 0.2 mole per mole of the total amounts of D- and L-α-amino-ε-caprolactam hydrochloride and within such a range that the additive can be dissolved in the polar solvent and that at least one optical isomer of D-NH₂Cl.HCl and L-NH₂Cl.HCl is dissolved in the polar solvent and the supersaturated dissolution state of the one optical isomer can be maintained, crystallizing the one optical isomer dissolved in said solution at the supersaturated state and recovering the crystallized product.

2. The process of claim 1, wherein the polar solvent contains, dissolved therein, racemic α-amino-ε-caprolactam hydrochloride in the supersaturated state.

3. The process of claim 1, wherein the polar solvent contains, dissolved therein, α-amino-168-caprolactam - hydrochloride in the supersaturated state, the said α-amino-ε-caprolactam hydrochloride comprising one optical isomer in an amount greater than the amount of the other optical isomer.

4. The process of claim 1, wherein the basic substance having a $pK_b$ value of not greater than 5 as measured at 25°C. in water is a mixture of D-α-amino-ε-caprolactam and L-α-amino-ε-caprolactam.

5. The process of claim 1, wherein the basic substance having a $pK_b$ value of not greater than 5 as measured at 250°C. in water is racemic α-amino-ε-caprolactam.

6. The process of claim 1, wherein the basic substance having a $pK_b$ value of not greater than 5 as measured at 25°C. in water is a member selected from the group consisting of aliphatic amines, alicyclic amines, heterocyclic amines, alkali metal hydroxides and alkaline earth metal hydroxides.

7. The process of claim 1, wherein the salt of a mixture of D- and L-α-amino-ε-caprolactam having a solubility in the said polar solvent which is greater than the solubility of D- and L-α-amino-ε-caprolactam hydrochloride in the said polar solvent is at least one member selected from organic carboxylic acid salts, carbonate and sulfate of a mixture of D- and L-α-amino-ε-caprolactam.

8. The process of claim 7, wherein the salt of a mixture of D- and L-α-amino-ε-caprolactam is at least one member selected from the group consisting of formate, acetate, propionate, and butyrate of a mixture of D- and L-α-amino-ε-caprolactam.

9. The process of claim 1, wherein the polar solvent solution is seeded with β-type crystals of D-α-amino-ε-caprolactam hydrochloride or L-α-amino-ε-caprolactam hydrochloride.

* * * * *

UNITED STATES PATENT OFFICE
CERTIFICATE OF CORRECTION

PATENT NO. : 3,879,382
DATED : April 22, 1975
INVENTOR(S) : HIDEO WATASE, ET AL.

It is certified that error appears in the above-identified patent and that said Letters Patent are hereby corrected as shown below:

Claim 1, line 28 thereof: cancel "carbom" and substitute -- carbon --

Claim 1, line 34 thereof: after "acids" cancel "," and substitute -- ; --

Claim 3, line 2 thereof: cancel "α-amino-168-caprolactam" and substitute -- α-amino-ε-caprolactam --

Claim 5, line 2 thereof: cancel "5as" and substitute -- 5 as --

Signed and sealed this 24th day of June 1975.

(SEAL)
Attest:

RUTH C. MASON
Attesting Officer

C. MARSHALL DANN
Commissioner of Patents
and Trademarks